United States Patent [19]
Watanabe et al.

[11] 3,745,502
[45] July 10, 1973

[54] HIGH TEMPERATURE STRAIN GAGE

[75] Inventors: Osamu Watanabe; Takeshi Shioda, both of Tokyo; Kenji Kanai, Kawasaki, all of Japan

[73] Assignee: Kyowa Electronic Instruments Co., Ltd., Tokyo, Japan

[22] Filed: Sept. 18, 1972

[21] Appl. No.: 290,148

[30] Foreign Application Priority Data
Sept. 28, 1971  Japan.................. 46/75017

[52] U.S. Cl. ........................... 338/3, 73/88.5 R
[51] Int. Cl. ........................................ G01l 1/22
[58] Field of Search ........................ 338/2–6; 73/88.5 R, 88.5 D

[56] References Cited
UNITED STATES PATENTS
2,920,298  1/1960  Hines..................... 338/3
3,245,018  4/1966  Russell................... 338/3 X
2,488,349  11/1949  Thurston................. 338/3

*Primary Examiner*—C. L. Albritton
*Attorney*—I. Irving Silverman, Gerald R. Hibnick et al.

[57] ABSTRACT

A high temperature strain gage comprising an active gage and a dummy gage mounted on a meshed metal base by means of heat-resisting adhesive such as ceramics. The gage is suitable to be mounted on a test piece either by spot welding or by an adhesive. The dummy gage is isolated from outer stress by providing openings in the meshed metal base around the dummy gage so that the dummy gage can always produce accurate temperature dependent error compensating output.

9 Claims, 4 Drawing Figures

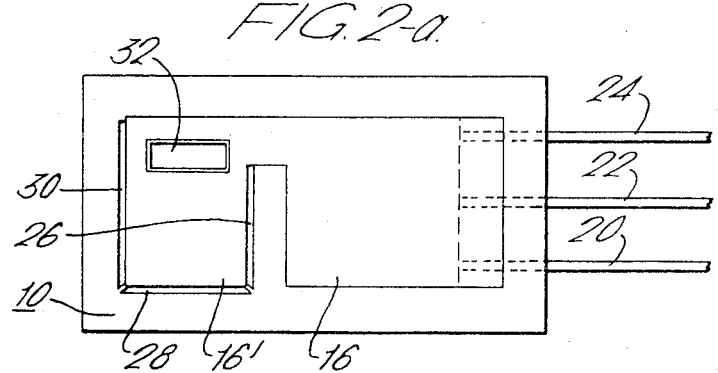
FIG. 2-a.
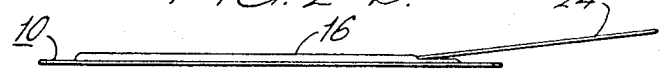
FIG. 2-b.
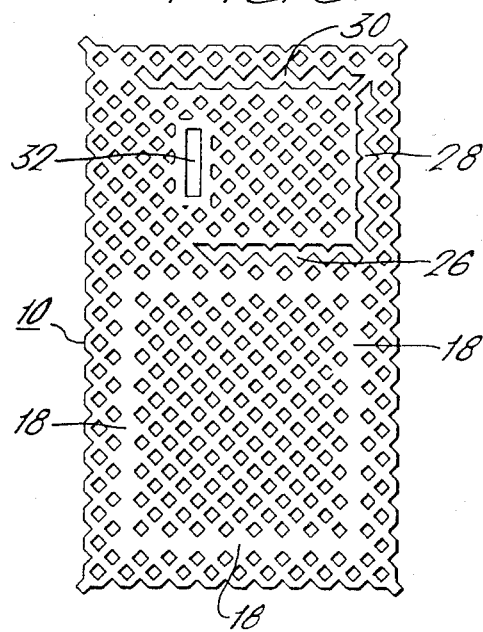
FIG. 3.

HIGH TEMPERATURE STRAIN GAGE

BACKGROUND OF THE INVENTION

1. Field of the Invention

The present invention relates to a high temperature strain gage, more particularly to a resistance wire type high temperature strain gage provided with a dummy gage for temperature dependent error compensation.

2. Description of the Prior Art

Various types of resistance wire strain gages for measuring strain in a high temperature body are known. One of known high temperature strain gage uses a metal base on which resistance wires or filaments constituting the strain gage bridge are mounted. Such a metal base strain gage is usually mounted on a test piece or a measuring body by spot welding. However, owing to its high rigidity, it was impossible or extremely difficult to mount such metal base strain gage by means of an adhevisive on a measuring element due to the fact of insufficient evaporation of the adhesive agent.

Also as another resistance wire type high temperature strain gage using glass cloth or asbestos as the mounting base has been known. Such gages using glass cloth or asbestos are usually mounted on a test piece by means of an adhesive. However, it is impossible to mount such glass cloth or asbestos base strain gage on a test piece by means of spot welding owing to the non-metallic nature of the mounting base.

J.D. Russell has disclosed in U.S. Pat. No. 3,245,018 a high temperature strain gage comprising a metallic tubular strain deformable base member filled with a mass of solid compactable electric insulating material mechanically locking a resistance element. Said mechanical locking type strain gage contemplated an improvement of resistance wire type strain gages which overcome disadvantages and limitation of bonded gages and unbonded gages. This strain gage has many advantages, however, as its base is in a form of a metallic tubular member, the mounting on a test specimen is only possible by welding, just as same as abovementioned metal base strain gages.

It has been known that if a strain gage is used at high temperature, the measured output shows a considerable temperature dependent error. This error is called as zero drift and it is particularly important problem to compensate such temperature dependent error for realizing a practical high temperature strain gage. As a usual means to compensate such zero drift, an active-dummy gage system has been known, in which a dummy gage is provided beside of an active gage used for the strain measurement. The dummy gage provides a compensating output to cancel the temperature dependent error of the active gage. In the known active-dummy type strain gages, the dummy gage usually receives strain occurring along its principal axis. In the conventional gages, an error caused by an applied strain of the dummy gage had been ignored. However, the inventors had found that under such situation, the compensation of the zero drift of the dummy gage is not sufficient and thus causes an erroneous output for a precise measurement.

The abovementioned metallic tubular strain gage filled with a mass of solid compactable insulating material is also provided with a dummy gage, but this gage has also above second disadvantage since the dummy gage is equally placed a location affected by strain. Furthermore, the conventional gages are usually mounted on a very rigid base so that a gage suitably used on a curved surface has not been realized.

SUMMARY OF THE INVENTION

The present invention has for its object to mitigate above disadvantages of the strain gages of the known type. According to the invention a high temperature gage is realized which can be mounted on a test specimen either by welding or by adhesive which affords a larger flexibility of the application of the strain gage by the two different mounting methods. The high temperature strain gage according to the present invention is furthermore given a construction in which the dummy gage is sufficiently isolated from any application of strain of the measuring subject so that it can respond only to the temperature variation and can produce a more exact temperature error compensating output.

BRIEF DESCRIPTION OF THE DRAWINGS

FIG. 1 is a plan view schematically illustrating a high temperature strain gage according to the present invention in an enlarged scale and every constructive part is shown to be seen through;

FIG. 2a is a bottom view of the strain gage of the present invention;

FIG. 2b is a side view of the same; and

FIG. 3 is a plan view showing one practical embodiment of a meshed metal base used in the strain gage according to the present invention.

DESCRIPTION OF THE PREFERRED EMBODIMENTS

Figure 1:
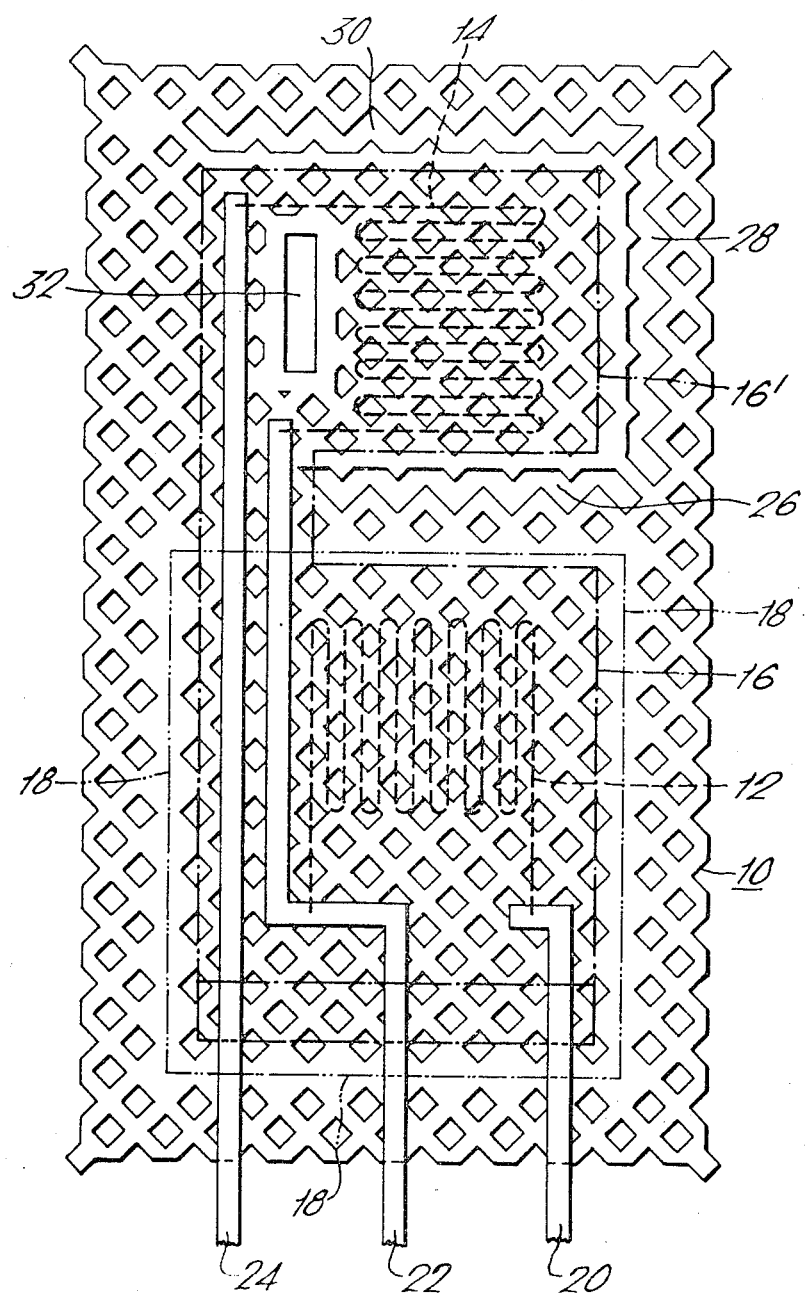

The invention will be explained with reference to the accompanied drawings.

FIG. 1 is a schematical view showing one embodiment of a high temperature strain gage according to the present invention in penetrative view. In this Figure only by a reason of convenience of preparing the drawing, a meshed metal base 10 is illustrated schematically but actually it is lattice shaped and one example of its practical form is as shown in FIG. 3. The meshed metal base 10 is made from a very thin metal plate for instance nickel chromium alloy plate using known technic such as photo-etching. The figure is illustrated in an enlarged scale, but an actual example is, for instance, in a size of 10 × 18 mm and the thickness is in an order of 0.1 mm. However, the present invention is not limited to such a particular size of the gage element.

On the meshed metal base 10, gage elements 12 and 14 are mounted by means of heat-resisting adhesive, such as ceramics. The gage elements 12 and 14 are of metal wire type and made from metals based on nickel, platinum, etc. The gage element 12 is an active gage and the element 14 is a dummy gage. An irregular shaped area encircled by lines 16 and 16' is the area at which the heat-resisting adhesive is applied for mounting the active gage 12 and the dummy gage 14. The active gage element 12 is connected electrically between leads 20 and 22 by welding or soldering. The dummy gage element 14 is connected between leads 22 and 24, also by welding or soldering. The lead wires 20, 22 and 24 are made of nickel, nickel chromium alloy, etc.

The active gage 12 and the dummy gage 14 are connected through the lead wires 20, 22 and 24 in a bridge circuit outside the gage element which is not shown.

The circuit itself is known and detailed explanation is omitted.

The meshed metal base 10 is provided with recesses or openings 26, 28, 30 and 32 around the dummy gage 14 in order to prevent conveyance of strain to the dummy gage 14. The recess can be made by etching or working at the time of manufacturing the meshed metal base 10.

For use the high temperature strain gage of the present invention, a rectangular square area portion of the meshed metal base 10 encircled by a chain line 18 is fixed on a test specimen or measuring body either by heat-resisting adhesive or by spot welding.

When the strain gage is mounted on a test piece by welding the edge portion of the square part of the area bound by line 18 or portion just underneath the chain line 18 is used and the gage can conveniently be mounted on a test piece by spot welding. For this purpose the meshes at portion 18 may be made blind as shown in FIG. 3.

When the gage is mounted on a test piece by heat-resisting adhesive such as ceramics, the area surrounded by the square line 18, more particularly, the peripheral meshed area can be used for fixing the gage on the measuring element. In this case care should be taken that the upper portion of the meshed metal base 10 where the dummy gage 14 is located should be left unbonded. The peripheral portion of the upper half of the meshed metal base 10 outside the openings 26, 28, 30 and 32 may either the bonded or unbonded.

By mounting the gage element on a test specimen only bonding through the area 18, the active gage 12 exactly receives strain as same as the measuring body. However, the dummy gage 14 is not subjected to such strain since the upper part of the meshed metal base 10 is unbonded and moreover it is encircled by the openings 26 to 32. Therefore, the dummy gage 14 is placed in a condition that its temperature is equally varied with that of the active gage 12 beside it is isolated from conveyance of any strain in the measuring body. Accordingly, th dummy gage 14 is able to produce pure temperature depending error compensating output without including an influence of the strain occurring in the test specimen.

FIG. 2a is a bottom view of the high temperature strain gage and FIG. 2b is a side view of the same. As can be seen from these figures, the top side of the active and dummy gages 12 and 14 may also be covered with ceramics for the purpose of protection. In these figures by reason of convenience the meshed metal base 10 is shown just schematically as a block.

As has been described already, according to the present invention the active gage and the dummy gage are mounted on a meshed metal base by means of heat-resisting adhesive such as ceramics, the active gage portion can be adhered by heat-resisting adhesive or by welding and the dummy gage portion is isolated from being affected by strain of the measuring object so that an improved high temperature strain gage can be realized which can produce a more exact temperature dependent error compensating output.

By numerous experiments, it has been found that the gage according to the present invention can practically be used in a high temperature without particular compensation even at 500°C. The gage factor is for instance 1.5 to 2.0 and the deviation of the gage factor is for instance less than about −5 percent at 300°C and less than about −15 percent at 500°C.

Furthermore the gage has a more flexibility for mounting on a measuring object either by spot welding or by heat-resisting adhesive.

The metal base can be made thin so that the gage can be mounted on a curved surface, for instance, having 20 cm radius without particular difficulty.

Although the invention has been described by referring to a particular embodiment, various modifications may be possible without departing from the scope of the present invention.

What is claimed is:

1. A high temperature strain gage comprising an active gage and a dummy gage mounted on a thin meshed metal base by means of heat-resisting adhesive, the meshed metal base is provided with openings surrounding the dummy gage to prevent conveyance of strain of measuring body and with a portion surrounding the active gage to be fixed onto said measuring body either by welding or by an adhesive.

2. A high temperature strain gage as claimed in claim 1, wherein the heat-resisting adhesive is ceramics.

3. A high temperature strain gage as claimed in claim 1, wherein the meshed metal base is made from a metal plate such as nickel chromium alloy.

4. A high temperature strain gage comprising an active gage (12) and a dummy gage (14) of metal wire type both mounted on a thin meshed metal base (10) by means of heat-resisting adhesive and are connected to lead wires (20, 22, 24), the meshed metal base (10) is provided with openings (26, 28, 30, 32) at locations surrounding the dummy gage (14) and the meshed metal base (10) is further provided with a portion (18) through which the strain gage can be mounted on a measuring body by welding and a peripheral meshed portion of the portion (18) through which the strain gage can be mounted on a measuring body by heat-resisting adhesive.

5. A high temperature strain gage as claimed in claim 4, wherein the heat-resisting adhesive is ceramics.

6. A high temperature strain gage as claimed in claim 4, wherein the meshed metal base is made from plate of nickel chromium alloy.

7. A high temperature strain gage as claimed in claim 4, wherein the meshes at the portion for welding are made blind to be fixed by spot welding.

8. A high temperature strain gage as claimed in claim 4, wherein the portion mounting the dummy gage (14) is surrounded by openings (26, 28, 30, 32) encircling the portion at four lateral directions.

9. A high temperature strain gage as claimed in claim 4, wherein the meshed metal base (10) is made by photo-etching.

* * * * *